July 14, 1970   R. L. MUOTKA ET AL   3,520,432
SELF-LOADING TRUCK

Filed April 12, 1968   2 Sheets-Sheet 1

INVENTORS
RAGNAR LUDVIG MUOTKA
BY LARS ERIK LANDEBORG
SUNE TORSTEN HENRIKSSON

*Whittemore,*
*Hulbert & Belknap*
ATTORNEYS

July 14, 1970  R. L. MUOTKA ET AL  3,520,432
SELF-LOADING TRUCK
Filed April 12, 1968   2 Sheets-Sheet 2

INVENTORS
RAGNAR LUDVIG MUOTKA
BY LARS ERIK LANDEBORG
SUNE TORSTEN HENRIKSSON

Whittemore,
Hulbert & Belknap
ATTORNEYS

United States Patent Office 3,520,432
Patented July 14, 1970

3,520,432
SELF-LOADING TRUCK
Ragnar Ludvig Muotka, Kyrkogaton 44, Kiruna; Lars Erik Landeborg, Per Alsin Hanssonvagen 523; and Sune Torsten Henriksson, Kvartsvagen 9, Kiruna, all of Malmo, Sweden
Filed Apr. 12, 1968, Ser. No. 720,834
Claims priority, application Sweden, May 11, 1967, 6,594/67
Int. Cl. B60p *1/48*
U.S. Cl. 214—508                                10 Claims

ABSTRACT OF THE DISCLOSURE

A self-loading truck including a load container swingable about a horizontal pivot axis at one end of the truck, a bucket for loading material into the load container pivotally mounted at one edge for swinging movement about the same pivot axis as the load container, arms at each side of the load container pivoted at one end to the load container adjacent the bottom and substantially centrally thereof for swinging movement toward the opposite ends of the load container, a blade extending transversely of the load container and pivotally mounted to the other end of the arms for swinging about a pivot axis therethrough, and means for swinging the blade about the pivot axis thereof. Movement of the load container, bucket, arms and blade is produced in the preferred embodiment by hydraulic piston and cylinder means. The bucket is provided with an arcuate surface adjacent the pivot axis thereof having substantially the same curvature described by the point of the blade on swinging the blade through the pivot axis thereof whereby with the bucket in an upper position and with the arms at the one end of the truck, the bucket is swept clean by the blade on swinging of the blade about the pivot axis thereof, and on swinging of the arms toward the other end of the load container the load is distributed in the load container.

---

The present invention relates to a truck of the self-loading type and therefore which is provided with a bucket and a load container in order to be used both for excavating and for conveying the excavated material.

In known trucks of the self-loading type the bucket is used not only for performing the excavating operation proper but also for conveying the excavated material to the load container and distributing it therein. Consequently, the bucket will be used for the excavation proper only during half or in many cases still less of the time required for the excavating and loading cycle, which prevents utilizing the truck in a rational way. In order that the bucket may be used for conveying and distributing the material it must be mobile in the longitudinal direction of the truck, for which reason it must be mounted on bucket arms. Despite the provision of reinforcing means this makes the excavating unit sensitive to corner stresses and lateral stresses to which it is exposed during excavation.

In order to avoid these drawbacks the self-loading truck according to the invention is characterized by being provided with a device which is operable independently of the bucket for the purpose of transferring the excavated material from the bucket to the load container and distributing the material therein.

The means for conveying and distributing the material preferably consists of a transfer and distributor blade, which is mounted so as to be articulated at the ends of arms swingably mounted on the load container in order to let a swinging movement of the blade sweep the excavated material in the bucket out of it and then withdrew the arms and consequently the distributor blade in order to move the material towards that end of the load container which is opposite to the bucket.

Since the bucket and the blade co-operate with each other only during the short time when the excavated material is swept out of the bucket, the excavating and loading operations may be performed independently of each other to about 90 percent, which entails that the load container can be filled in about half the time required in self-loading trucks of the known type.

As the bucket does not have to be mobile in the longitudinal direction of the truck, it does not have to be carried by bucket arms but may be directly connected with the load container and frame of the truck in an articulated manner at the tilting centre. Thereby, the bucket becomes less sensitive to lateral stresses and permits development of a considerable propulsion power into the excavated material to be loaded, without requiring special reinforcing means.

The bucket and the distributor blade are preferably operated by means of double-acting hydraulic cylinders so that the operation of the blade may be completely automatic.

Figure 1:
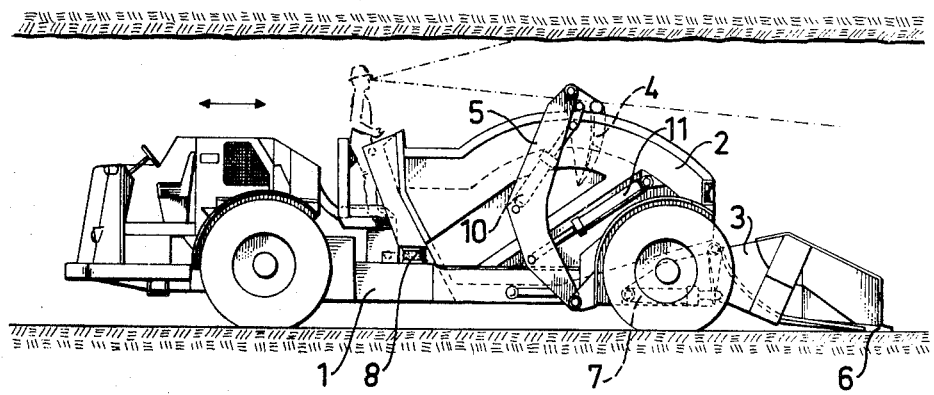
Figure 2:
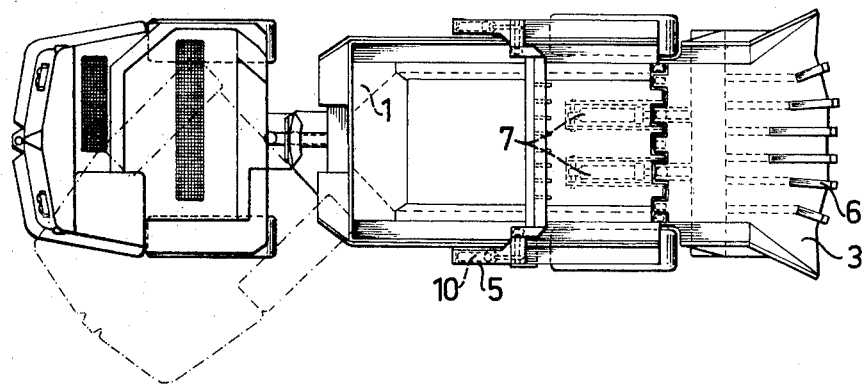

Further objects and advantages of the invention will be apparent from the following specification describing an embodiment of the truck according to the invention chosen by way of example, and in which FIG. 1 is a lateral view of one embodiment of the truck according to the invention, FIG. 2 is a plan view of the truck according to FIG. 1, and FIGS. 3 to 6 are elevations of the truck in various working positions.

The self-loading truck shown in the drawings consists of a front carriage and a rear carriage which are articulated to each other. The front carriage carries the driving means of the truck and is equipped with a driver's seat and operating means used for driving while the rear carriage carries means necessary for excavating and loading as well as operating means therefor and is equipped with a driver's seat used during the excavating and loading operations.

The rear carriage is built on frame side members 1 which are united with each other by means of an angular member at that end of the rear carriage which is adjacent to the front carriage. At the rear ends of the frame side members there are mounted a load container 2 and a bucket 3 in such a way as to be pivotable about a horizontal joint. Furthermore, the truck has a transfer and distributor blade 4 which is swingably carried between two arms 5 which are also swingably mounted at both sides of the load container and at the lower end thereof.

The bucket 3 is of a type known per se and has essentially the same width as the truck itself. The width of the bucket increases slightly towards its front end, where the bucket 3 is also provided with teeth 6. Due to the fact that the bucket is only used for the digging operation proper, it only has to be movable in one respect, namely swingably in the vertical plane. Thus, it is mounted in an articulated manner at the top portion of its rear end with the same pivot axis as the load container 2. The swinging of the bucket 3 is carried out by means of two piston-cylinder units 7 which are mounted in an articulated manner between the frame of the truck and the lower portion of the rear end of the bucket 3.

The load container 2 is single-walled and preferably consists of high-grade, wear-resistant steel. As mentioned, the container 2 is swingably mounted at the rear ends of the frame side members 1 and has the same pivot axis as the bucket 3. In its normal, lowered position the bucket 3 rests against a damping means 8 mounted on the frame side members 1. Tilting of the load container 2 is carried out by means of two telescopic tilting cylinders 9 shown in FIG. 6 and connected in an articulated manner between the front end of the load container and the frame side members.

The blade 4 is swingably carried, as mentioned before, between two arms 5 swingably mounted at each side of the lower portion of the load container 2, which arms are slightly arcuate in a direction towards the rear end of the truck. The swinging motion of the blade 4 in relation to the arms 5 is controlled by means of piston-cylinder units 10 which are mounted in an articulated manner between the blade 4 and each arm 5 approximately at the middle of the arms. Swinging the arms 5 and consequently displacing the blade 4 in the longitudinal direction of the load container 2 is also performed by means of piston-cylinder units 11, which are mounted in an articulated manner between the upper and the rear portion of the side walls of the load container 2 and the arms 5.

In order to bring about the right co-operation between the bucket and the blade when the blade removes excavated material from the bucket as a result of being swung in relation to the arms, the bottom of the bucket has an arcuate portion at its rear end, the centre of curvature of which coincides with the pivot axis of the blade when the bucket and the blade are adjusted to co-operate with each other. The radius of curvature of the rear end of the bucket consequently has a length corresponding to the distance between the pivot axis of the blade and its point 12.

Figure 3:
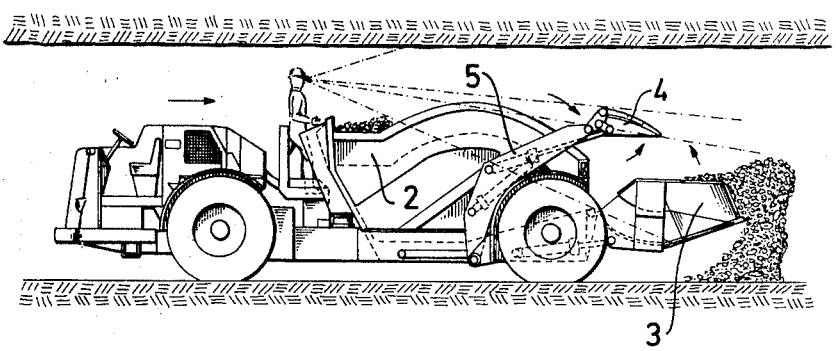

FIG. 1 shows the bucket 3 and the blade 4 in the positions which they occupy when scraping and receiving excavated material in the bucket 3. When it has been propelled into the excavated material and been filled, the bucket is swung upwards while the truck is driven slowly towards the excavated material. At the same time the arms 5, and consequently the blade 4, are displaced towards the rear, in which connection the blade is also swung upwards to an essentially horizontal position, as shown in FIG. 3.

Figure 4:
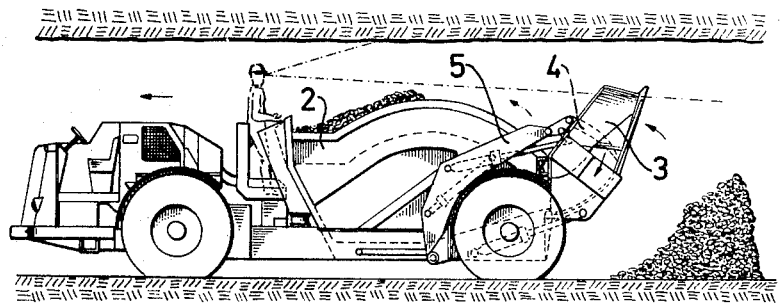

In the position shown in FIG. 4, the bucket 3 has been swung upward so far that it will engage with the front end of the blade 4. The blade is then automatically swung downward by the cylinder units 10, so that the excavated material is swept out of the bucket 3 and down into the load container 2. At the same time the truck moves away from the material in order to occupy its starting position for a new scraping operation and for receiving the excavated material in the bucket.

When the bucket 3 is swung downward in order to receive a new quantity of excavated material, the arms 5 and the blade 4 are moved automatically towards the end of the load container 2 which is opposite to the bucket in order to displace the material towards that end of the bucket by means of scraping movement. During this operation the bucket 3 and the blade 4 have essentially resumed the positions shown in FIG. 1. When the resistance of the load to the scraping movement reaches a certain limit value, the scraping movement stops and the blade 4 returns to a waiting position at the front end of the load container. This waiting position corresponds to the position of the blade shown in FIG. 5.

This cycle is repeated until the load container is almost full. At the last excavating cycle but one before the container is completely filled, the blade 4 can only just be moved without being hindered by the load in the container 2, and when the last container has swung upward to the position shown in FIG. 5, the blade, after its cylinder unit 10 has been made inoperable, is withdrawn from the excavated material as a result of a manual impulse to the cylinder unit 11. The transfer and distributor blade 4 is then moved to the conveying and waiting position shown in FIG. 5, where the blade is positioned at the front end of the load container and rests on the load at the free end.

Figure 5:
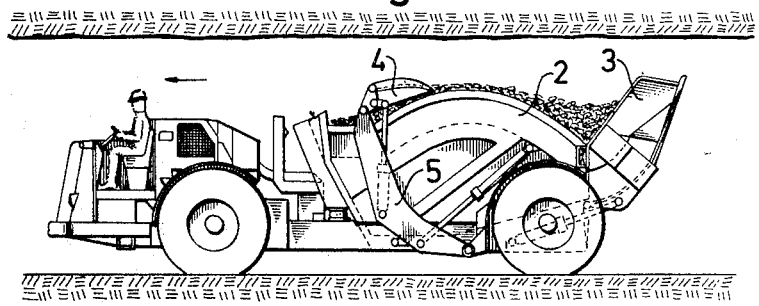
Figure 6:
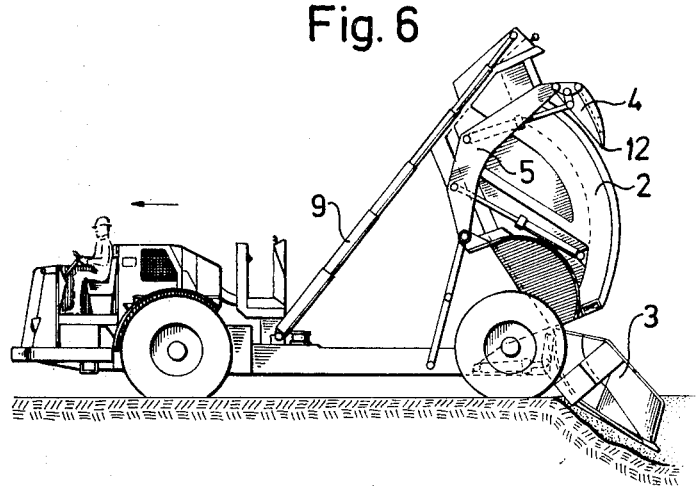

At the tilting of the load the arms 5, as shown in FIG. 6, remain in their position shown in FIG. 5 in relation to the load container 2, while the bucket 3 is in its lowest possible position. The bucket is emptied when the truck moves forward, simultaneously accelerating, during which operation the shaking motions and the cohesion of the material contribute to emptying the bucket despite the relatively insignificant slope angle. If the bucket, as shown in FIG. 6, can be moved down into a shaft, the emptying operation will of course be facilitated considerably.

What we claim as our invention is:

1. A self-loading device including a frame, a load container secured to the frame adjacent one end thereof receiving material, a bucket also secured to the frame adjacent said one end thereof for receiving material to be placed in the load container, a blade extending transversely of the load container for transferring material received in the bucket into the load container and arm means carrying the blade and secured to the load container for moving the blade along the load container to distribute the material over the load container.

2. Structure as set forth in claim 1, wherein the arm means comprises a separate arm pivoted to each side of the load container adjacent the bottom thereof and centrally thereof and means for swinging the arm means between the opposite ends of the load container.

3. Structure as set forth in claim 1, and further including means for pivotally securing the blade to the arm means for swinging movement about a horizontal pivot axis therethrough.

4. Structure as set forth in claim 1, and further including means for pivotally securing the bucket at one edge thereof to the frame for swinging movement about a horizontal pivot axis therefor extending transverse of the load container.

5. Structure as set forth in claim 4, wherein in an upper pivoted position the bucket is engaged by the blade in one pivoted position thereof and piston and cylinder means connected between the frame and bucket for pivoting the bucket into an upper position.

6. Structure as set forth in claim 5, wherein the bucket is provided with an arcuate bottom surface adjacent the horizontal pivot axis therefor having a radius of curvature defined by the point of the blade on movement of the blade.

7. Structure as set forth in claim 1, wherein the load container is pivoted to the frame at one end thereof for swinging movement about a transverse pivot axis at one end of the frame.

8. Structure as set forth in claim 1, wherein the device is a truck, the arm means includes an arm on each side of the load container pivotally secured to the load container for swinging movement toward the opposite ends of the load container about a pivot axis extending transversely of the load container and positioned substantially at the bottom and centrally thereof, the blade is pivotally secured to the other ends of the arms for swinging movement about a pivot axis extending transverse of the load container, the bucket is pivotally mounted at one edge thereof for swinging movement about a horizontal pivot axis extending transversely of the load container into a lower and upper position in the lower position of which the bucket is normally loaded and in the upper position of which the blade on pivot movement thereof about the transverse pivot axis of the blade removes material loaded into the bucket and on swinging movement of the arms about the pivot axis thereof distributes the material in the load container.

9. Structure as set forth in claim 8, wherein the bottom of the bucket adjacent the pivot axis thereof is arcuate and has the same radius of curvature described by the point of the blade in movement of the blade about pivot axis therefor with the arms in a limiting position at one end of the load container.

10. Structure as set forth in claim 8, wherein the load container is pivotally secured to the frame of the truck for swinging movement about the same pivot axis as the bucket.

References Cited

UNITED STATES PATENTS

| | | | |
|---|---|---|---|
| 1,759,072 | 5/1930 | Thomson | 214—90 |
| 2,405,756 | 8/1946 | Rodefeld | 214—79 |
| 3,105,311 | 10/1963 | Hait | 37—4 |
| 3,127,038 | 3/1964 | Allard | 214—90 |
| 3,221,424 | 12/1965 | Hancock | 37—4 X |
| 3,273,732 | 9/1966 | Trieschmann | 214—78 X |
| 3,356,240 | 12/1967 | Zink | 214—78 X |

FOREIGN PATENTS 747,143   3/1956   Great Britain.

GERALD M. FORLENZA, Primary Examiner

R. J. SPAR, Assistant Examiner

U.S. Cl. X. R.

214—78, 146, 518